Figure 1:
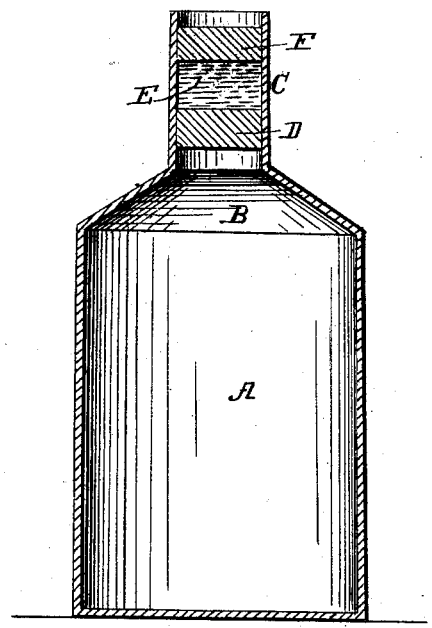

G. W. GRISWOLD.
Fruit Can.

No. 35,933.

Patented July 22, 1862.

Witnesses:

Inventor:

UNITED STATES PATENT OFFICE.

GEORGE W. GRISWOLD, OF LOGANSPORT, INDIANA.

IMPROVED CAN FOR PRESERVING FRUITS, &c.

Specification forming part of Letters Patent No. 35,933, dated July 22, 1862.

*To all whom it may concern:*

Be it known that I, GEORGE W. GRISWOLD, of Logansport, in the county of Cass and State of Indiana, have invented certain new and useful Improvements in Cans or Jars for Preserving Fruits, Meats, &c.; and I do hereby declare that the following is a full, clear, and exact description of the same, reference being had to the accompanying drawings, which represent a vertical section through a can or jar, showing the method of sealing the neck or opening through which the fruit or other thing to be preserved is inserted.

My can or jar may be made of tin, glass, or any other suitable metallic, mineral, or vitrified substance, and of any shape and size that may be desired. The body A of the can or jar, for convenience, may be cylindrical, with a dome, B, from which rises a neck, c, that increases gradually in area from its bottom to its top. This constitutes the can or jar, and, with the exception of a cork or corks as stoppers and of a liquid or fluid packing over the lower or under cork, embraces all that is necessary for sealing the can, jar, or vessel, and making it impervious to air.

The filling and sealing of the can, jar, or vessel is as follows: The fruit, meat, or whatever article is to be inclosed or preserved, may either be properly heated after it is put in the can, jar, or vessel, or before it is placed therein, sufficiently to expel the air from the interior of the vessel or its contents, or to expand the contents, so as to fill the can, jar, or other vessel nearly to the top of the neck, leaving room for a cork or stopper, D, and for a covering of molasses, honey, sirup, or any other liquid or fluid, E, that would not become tainted by age. This stopper D, made of cork or any other flexible or elastic material, and the liquid covering E of themselves make a perfectly tight sealing; but to prevent dirt or dust from settling upon the liquid or fluid packing, or to prevent its evaporization, a second stopper, F, of cork, or any other compressible material, may be used.

If the cans or jars are to be transported, the second cork or stopper, F, must be used to prevent the liquid packing from being shaken off or spilled.

I find in practice that as the fruit or contents of the can or jar cool they will contract, and that the atmospheric pressure upon the cork or packing will cause them to descend in the gradually-tapered neck, following the fruit or contents, and thus preventing any space between the cork and the fruit, which space is not only injurious to the fruit or contents, but often causes a glass jar to break when it is being opened. Some material may be preserved with a cork or stopper alone, particularly if the cork or stopper be made of any material impervious to air—as, for instance, rubber; and so long as the neck of the can or jar and the cork or stopper are so made as that atmospheric pressure on the cork shall cause it to follow the shrinking of the contents of the can or jar, I should claim it as embracing my invention. As the cork or stopper D continues to descend in the neck c by the atmospheric pressure produced, as heretofore described, additional liquid packing E may be added, and when the contents of the can or jar become cool the cork F, or any other covering that will serve its purposes, may be inserted.

I may mention that in practice I have found that the contents of a two-quart can, which had a neck three inches long and one and a half inch in diameter, will shrink enough to draw the cork down into the neck some two inches.

Having thus fully described my invention, what I claim is—

A fruit-can or jar having a tapering neck, as described, down which a cork, or a cork and liquid packing, may be forced or drawn by atmospheric air produced by the shrinking of the contents of said can or jar, as described, and for the purposes mentioned.

G. W. GRISWOLD.

Witnesses:
   A. W. COLVIN,
   JAS. FREAR.